United States Patent [19]

David

[11] Patent Number: 4,987,206
[45] Date of Patent: Jan. 22, 1991

[54] CROSSLINKING OF AROMATIC ETHER CONTAINING POLYMERS BY HALOCARBONS

[75] Inventor: Israel A. David, Wilmington, Del.

[73] Assignee: E. I. du Pont de Nemours and Company, Wilmington, Del.

[21] Appl. No.: 532,414

[22] Filed: Jun. 4, 1990

[51] Int. Cl.$^5$ .............................................. C08G 6/00
[52] U.S. Cl. .................................. 528/125; 528/126; 528/128; 528/153; 528/154; 528/220; 528/481; 528/491; 528/503
[58] Field of Search ............... 528/125, 126, 128, 153, 528/154, 220, 481, 491, 503

[56] References Cited

U.S. PATENT DOCUMENTS

| | | | |
|---|---|---|---|
| 2,631,993 | 3/1953 | Morgan | 525/426 |
| 2,734,045 | 2/1956 | Nelson | 529/409 |
| 3,423,335 | 1/1969 | Phillips | 525/333.3 |
| 4,816,556 | 3/1989 | Gay et al. | 528/176 |
| 4,859,715 | 8/1989 | Dubrow et al. | 521/180 |
| 4,897,307 | 1/1990 | Beck et al. | 428/398 |

OTHER PUBLICATIONS

V. Korshak et al., Vysokomol. Soedin, Ser. A, vol. 29, pp. 140–146 (1987).
V. A. Davankov, et al., Angew. Makromol. Chem., vol. 32, pp. 145–151 (1973).
C. D. Nenitzescu et al; Ann., vol. 491, pp. 189–220, (1931).

Primary Examiner—John Kight, III
Assistant Examiner—Sam A. Acquah

[57] ABSTRACT

This invention relates to a process for cross-linking polymers that contain aromatic ether containing rings by heating the polymers together with selected halocarbon compounds. The crosslinked polymers have improved chemical resistance.

27 Claims, No Drawings

CROSSLINKING OF AROMATIC ETHER CONTAINING POLYMERS BY HALOCARBONS

FIELD OF INVENTION

This invention relates to a process for crosslinking polymers containing aromatic ethers by heating such polymers with selected halocarbons and to products resulting from such process. The resulting crosslinked polymers have improved chemical resistance.

BACKGROUND OF THE INVENTION

It is known in the literature that polymers containing aromatic rings may be crosslinked in a Friedel-Crafts type of reaction employing a halocarbon and a catalyst, such as aluminum chloride. Thus the aromatic ring containing polymer, for example polystyrene, may be crosslinked by reaction with poly(trichlorobutadiene) and aluminum chloride, V. Korshak, et. al., Vysokomol. Soedin., Ser. A, vol. 29, pp. 140–146 (1987), or with bis(chloromethyl)diphenyl, V. A. Davankov, et. al., Angew. Makromol. Chem., vol. 32, pp. 145–151 (1973).

U.S. Pat. No. 3,423,335 discloses the use of paraxylylene dihalides [1,4-bis(halomethyl)benzenes] to crosslink polymers containing aromatic rings that contain hydrogen atoms attached to these rings. These reactions are carried out at 150° C. to 500° C., with or without catalysts present. The instant invention does not involve the use of this type of halocarbon.

C. D. Nenitzescu, et. al., Ann., vol. 491, pp. 189–220, (1931) report the uncatalyzed reaction of benzyl chloride with compounds such as biphenyl, naphthalene, anisole and mesitylene to yield the corresponding diarylmethane. No mention is made of the use of polymers.

U. S. Pat. Nos. 2,631,993 and 2,734,045 provide for the crosslinking of certain polymers, all of which have nitrogen containing substituents, by reaction with halocarbons containing at least two halogen atoms. These processes are carried out at lower temperatures than the instant process, and, as stated in '993, are believed to occur because of quaternization of the nitrogen substituents. The present invention does not require nitrogen substituents.

It is the purpose of this invention to provide methods for crosslinking polymers containing aromatic ethers with halocarbons, wherein the crosslinking reaction is carried out without any catalyst present. This is advantageous in many cases since a catalyst may also catalyze other, unwanted, reactions, and the catalyst residues may have deleterious effects on the stability or other properties of the crosslinked polymer. Removal of catalyst residues can be costly and difficult.

SUMMARY OF THE INVENTION

The invention concerns a process for crosslinking polymers, comprising, contacting an aromatic ether containing polymer with a halocarbon containing two or more chlorine, bromine or iodine atoms bound to one or more saturated carbon atoms, at a temperature of about 200° C. or more, for a period of time sufficient to crosslink the polymer, provided that said temperature is about at or above the glass transition temperature of said polymer, and further provided that said saturated carbon atoms to which said chlorine, bromine or iodine atoms are bound, are not directly bonded to an aromatic ring. The invention further relates to the products of such process.

DETAILS OF THE INVENTION

Polymers useful in the present invention contain aromatic ethers, that is containing ether oxygen bound to two aromatic rings derived from, for example, benzene, naphthalene, biphenyl, and the like. In order for the crosslinking reaction to take place there should be at least one (on at least some monomer units, preferably at least 2% of the total monomer units), and preferably more than one, hydrogen atom bound to aromatic ether containing ring carbon atoms However, with this proviso to contain at least one hydrogen atom, the aromatic ether containing rings in the polymer (and any other groups) may be substituted with any group that does not interfere with the crosslinking reaction and is stable at the process temperature. Suitable groups include, but are not limited to, ether, alkyl, cycloalkyl, ester, and the like. The aromatic ether containing rings may be part of the main chain of the polymer, or present as side (pendant) groups. Naturally, the polymer as a whole should be substantially stable at the process temperature. It is preferred if at least some of the ether containing aromatic rings in the polymer are not substituted with highly electron withdrawing substituents. Such substituents are well known to those skilled in the art, and include, but are not limited to, nitro, trifluoromethyl, and cyano. It is believed that electron withdrawing substituents on an aromatic ring may slow the crosslinking reaction. It is preferred if some of the aromatic rings in the polymer are joined by carbonyl groups, that is are diaryl ketones, such as in PEEK and PEKK (infra).

Polymers useful in the present process include, but are not limited to, poly(etheretherketone) (herein PEEK, for polymer structure see below), poly(etherketone-ketone) (herein PEKK, for polymer structure see below), and poly(phenylene oxide). Preferred polymers are PEEK and PEKK.

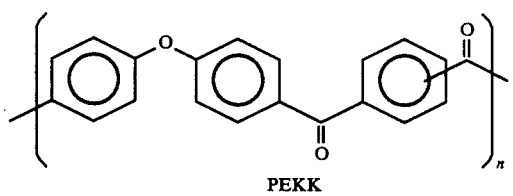

PEKK

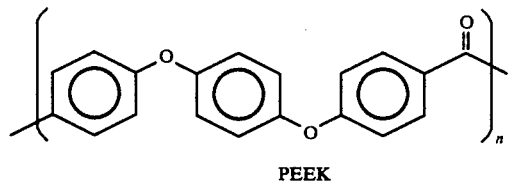

PEEK

The halocarbons useful in the present process are those compounds which have two or more chlorine, bromine or iodine atoms bound to one or more saturated carbon atoms. Chlorine and bromine are the preferred halogens, and chlorine is most preferred. By a saturated carbon atom is meant a carbon that does not have any groups bound by multiple (double or triple) bonds to it. Thus these carbon atoms will typically be atoms in alkyl or cycloalkyl groups. The halocarbon may contain other substituents, so long as such substituents do not interfere with the crosslinking reaction, and the halocarbon is substantially stable at the process temperature. Suitable substituents includes, but are not limited to, carbonyl, ether, and ester.

A limitation of the structure of the halocarbon is that the saturated carbon atom to which the halogen atom is attached cannot be directly bound to an aromatic ring. Such compounds, where the halogen bearing carbon is directly bound to an aromatic ring, are sometimes referred to as "benzyl or benzylic halides". Examples of the types of aromatic rings to which the carbon atom cannot be bound, include, but are not limited to, benzene, naphthalene, anthracene, pyridine, furan, biphenyl, and the like. This limitation does not preclude the possibility that the halocarbon can contain aromatic rings more remote from the halogen bearing carbon atom.

Halocarbons suitable for use in this process, include, but are not limited to, methylene chloride, 1,2-dichloroethane, 1,4-dichlorobutane, dibromomethane, 1,1,1-trichloroethane, 1,10-dichlorodecane, 2,3-dichlorobutane and 1,6-dichlorohexane. Preferred halocarbons are methylene chloride, chloroform, 1,4-dichlorobutane, 1,2-dichloroethane, 1,1,1-trichloroethane and 1,10-dichlorodecane.

The process temperature is above about 200° C., preferably about 200° C. to about 350° C. In addition, the process temperature should be about at or above the glass transition temperature of the polymer. Glass transition temperatures of polymers are familiar to those skilled in the art, and many such values are available in standard reference works. They may be measured by well known techniques, such as differential scanning calorimetry.

The amount of time necessary to crosslink the polymer, will of course, vary somewhat with the polymer, halocarbon and temperature. Typical process times at about 200° C. are about 30 to 60 min, while at 250° C., about 5 to 60 min.

The process is preferably run in the absence of oxygen, to prevent oxidation of the polymer and/or halocarbon. Water should be avoided when moisture sensitive polymers are used. It is therefore convenient to run the process under an inert atmosphere, such as nitrogen or argon.

The polymer may be contacted with the halocarbon in the liquid or vapor phase. If low boiling halocarbons are used, a pressure vessel to contain the halocarbon may be desirable.

Typically about 1 mole percent to about 20,000 mole percent, of the number of polymer repeat units, of halocarbon will be used. It is preferred if about 10 mole percent to about 5,000 mole percent of halocarbon is present. It will be understood that large excesses of halocarbon in actual contact with the polymer (as opposed to being within the reaction vessel) is deleterious to crosslinking.

It is preferred if the polymer is semicrystalline and the process is carried out above the glass transition temperature, but below the crystalline melting point. In this way shaped polymer parts may undergo the process, and still retain their shapes after the processing. Such useful shapes include, but are not limited to, fibers, films and molded parts. In another preferred embodiment, the polymer being crosslinked is in the form of a shaped article.

Such crosslinked polymers have improved chemical and solvent resistance, and retain their shape better at elevated temperatures than noncrosslinked polymers. They are thus useful for filters for the stacks of high sulfur coal burning furnaces, protective clothing, and engineered parts.

In the following examples PEEK, Grade 380, was obtained from ICI Americas, Inc., Wilmington, DE. PEKK was made by the process described in U.S. Pat. No. 4,816,556. The solubility of a polymer in a known solvent for that polymer was used to determine if the polymer was crosslinked. Polymers that were insoluble were deemed crosslinked.

EXAMPLE 1

PEKK film (0.086 g) was heated with 15 cc of methylene chloride (boiling point 40° C.) at 250° C. under autogenous pressure in a nitrogen atmosphere in a sealed vessel for 1 hr. The resulting brown film was insoluble and swelled in a 50:50 volume mixture of 1,2,4-trichlorobenzene and phenol after 2 hrs at 180° C., indicating it was crosslinked. It had a $q_m$ (swelling ratio) of 10.1 in this solvent.

EXAMPLE 2

PEKK yarn drawn at 2.4x draw ratio (2.1 g) was heated with 30.1 g of methylene chloride (5,000 mole %) under autogenous pressure in a sealed vessel at 250° C. for 1 hr. The resulting yarn was insoluble in 180° C. 50:50 volume mixture of 1,2,4-trichlorobenzene and phenol and in 100° C. sulfuric acid. Tensile properties were somewhat reduced because of a higher elongation due to the relaxation permitted during crosslinking:

|  | Crosslinked | Uncrosslinked |
| --- | --- | --- |
| Denier | 4.9 | 2.6 |
| Tenacity (gpd.) | 1.2 | 3.7 |
| Elongation (%) | 52.3 | 35.5 |
| Modulus (gpd./%) | 16.7 | 49.7 |
| Toughness (gpd. %) | 0.44 | 0.86 |

EXAMPLE 3

PEKK film (0.183 g) was heated with 16.2 g of 1,1,1-trichloroethane (boiling point 75° C.) at 220° C. under autogenous pressure in a nitrogen atmosphere in a sealed vessel for 1 hr. The resulting black film was insoluble and swelled in a 50:50 volume mixture of 1,2,4-trichlorobenzene and phenol after 2 hrs at 180° C., indicating it was crosslinked. It had a $q_m$ of 8.0 in this solvent. It was also insoluble in concentrated sulfuric acid after heating at 100° C. for 1 hr.

EXAMPLE 4

PEKK film (0.120 g) was heated with 15 cc of chloroform (boiling point 61° C.) at 250° C. under autogenous pressure in a nitrogen atmosphere in a sealed vessel for 1 hr. The resulting black film was insoluble and swelled in a 50:50 volume mixture of 1,2,4-trichlorobenzene and phenol after 2 hrs at 180° C., indicating it was crosslinked. It had a $q_m$ of 8.0 in this solvent.

EXAMPLE 5

PEKK film (0.119 g) was heated with 15 cc of 2,3-dichlorobutane (boiling point 118° C.) at 250° C. under autogenous pressure in a nitrogen atmosphere in a sealed vessel for 1 hr. The resulting black film was insoluble and swelled in a 50:50 volume mixture of 1,2,4-trichlorobenzene and phenol after 2 hrs at 180° C., indicating it was crosslinked. It had a $q_m$ of ~19 in this solvent.

EXAMPLE 6

PEKK polymer (0.45 g) was heated in a boiling solution (under reflux) of 32 μl (10 mole %) of 1,10-dichlorodecane in octadecane (boiling point 317° C.). The polymer softened somewhat and the solution turned red. Tetrahydrofuran was added to the flask to wash the polymer and then removed by decantation. The polymer was further washed with water and methanol in the same fashion, and then dried in the air at room temperature. It was insoluble in concentrated sulfuric acid at 100°–110° C. and was highly swollen, but insoluble, in a 50:50 volume mixture of 1,2,4-trichlorobenzene and phenol after 2 hrs at 180° C., indicating that it was lightly crosslinked.

EXAMPLE 7

PEEK polymer (0.58 g) was heated with 0.042 g (10 mole %) of 1,10-dichlorodecane at 250° C. under a nitrogen atmosphere for 1 hr with occasional manual stirring. The polymer remained solid and visually unchanged. It was insoluble and swelled in a 50:50 volume mixture of 1,2,4-trichlorobenzene and phenol after 2 hrs at 180° C., indicating it was crosslinked.

Although preferred embodiments of the invention have been described hereinabove, it is to be understood that there is no intention to limit the invention to the precise constructions herein disclosed, and it is to be further understood that the right is reserved to all changes coming within the scope of the invention as defined by the appended claims.

What is claimed is:

1. A process for crosslinking polymers, comprising, contacting an aromatic ether containing polymer with a halocarbon containing two or more chlorine, bromine or iodine atoms bound to one or more saturated carbon atoms, at a temperature of about 200° C. or more, for a period of time sufficient to crosslink the polymer, provided that said temperature is about at or above the glass transition temperature of said polymer, and further provided that said saturated carbon atoms to which said chlorine, bromine or iodine atoms are bound, are not directly bonded to an aromatic ring.

2. The process as recited in claim 1 wherein said aromatic ether containing polymer has some monomer units wherein one or more hydrogen atoms are bound to aromatic ether containing ring carbon atoms.

3. The process as recited in claim 2 wherein said halocarbon contains two or more chlorine or bromine atoms.

4. The process as recited in claim 3 wherein said halocarbon contains two or more chlorine atoms.

5. The process as recited in claim 2 wherein said temperature is about 200° C. to about 350° C.

6. The process as recited in claim 4 wherein said temperature is about 200° C. to about 350° C.

7. The process as recited in claim 2 wherein said polymer is PEEK, PEKK, or poly(phenylene oxide).

8. The process as recited in claim 6 wherein said polymer is PEEK or PEKK.

9. The process are recited in claim 7 wherein said polymer is PEEK or PEKK.

10. The process as recited in claim 2 wherein said halocarbon is selected from methylene chloride, 1,2-dichloroethane, 1,4-dichlorobutane, dibromomethane, 1,1,1-trichloro-ethane, 1,10-dichlorodecane, 2,3-dichlorobutane and 1,6-dichlorohexane.

11. The process as recited in claim 6 wherein said halocarbon is selected from methylene chloride, 1,2-dichloroethane, 1,4-dichlorobutane, dibromomethane, 1,1,1-trichloro-ethane, 1,10-dichlorodecane, 2,3-dichlorobutane and 1,6-dichlorohexane.

12. The process as recited in claim 9 wherein said halocarbon is selected from methylene chloride, 1,2-dichloroethane, 1,4-dichlorobutane, dibromomethane, 1,1,1-trichloro-ethane, 1,10-dichlorodecane, 2,3-dichlorobutane and 1,6-dichlorohexane.

13. The process as recited in claim 10 wherein said halocarbon is selected from methylene chloride, chloroform, 1,4-dichlorobutane, 1,2-dichloroethane, 1,1,1-trichloro-ethane and 1,10-dichlorodecane.

14. The process as recited in claim 11 wherein said halocarbon is selected from methylene chloride, chloroform, 1,4-dichlorobutane, 1,2-dichloroethane, 1,1,1-trichloro-ethane and 1,10-dichlorodecane.

15. The process as recited in claim 12 wherein said halocarbon is selected from methylene chloride, chloroform, 1,4-dichlorobutane, 1,2-dichloroethane, 1,1,1-trichloro-ethane and 1,10-dichlorodecane.

16. The process as recited in claim 2 wherein said polymer is crystalline, and said temperature is above said glass transition temperature, but below the crystalline melting point.

17. The process as recited in claim 2 wherein said polymer is in the form of a shaped article.

18. The process as recited in claim 16 wherein said polymer is in the form of a shaped article.

19. The product of the process of claim 7.

20. The product of the process of claim 8.

21. The product of the process of claim 9.

22. The product of the process of claim 13.

23. The product of the process of claim 14.

24. The product of the process of claim 15.

25. The process of claim 2 conducted in the absence of oxygen.

26. The process of claim 25 conducted in an inert atmosphere.

27. The process of claim 2 conducted in the absence of water.

* * * * *